(12) United States Patent
Hennige et al.

(10) Patent No.: US 8,053,102 B2
(45) Date of Patent: Nov. 8, 2011

(54) ELECTRIC SEPARATOR, METHOD FOR THE PRODUCTION AND USE THEREOF

(75) Inventors: Volker Hennige, Duelmen (DE); Christian Hying, Rhede (DE); Gerhard Hoerpel, Nottuln (DE)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 12/870,933

(22) Filed: Aug. 30, 2010

(65) Prior Publication Data

US 2010/0323233 A1 Dec. 23, 2010

Related U.S. Application Data

(62) Division of application No. 10/504,144, filed as application No. PCT/EP03/00329 on Jan. 15, 2003.

(30) Foreign Application Priority Data

Feb. 26, 2002 (DE) .................................. 102 08 277

(51) Int. Cl.
*H01M 2/14* (2006.01)
*H01M 2/16* (2006.01)

(52) U.S. Cl. ........ 429/129; 429/134; 429/145; 429/247; 429/249; 429/251; 429/252

(58) Field of Classification Search .................. 429/129, 429/134, 145, 247, 249, 251, 252
See application file for complete search history.

(56) References Cited

U.S. PATENT DOCUMENTS

| 3,861,963 A | 1/1975 | Afrance et al. |
| 4,557,957 A | 12/1985 | Manniso |
| 5,389,433 A | 2/1995 | Chang et al. |
| 5,707,756 A | 1/1998 | Inoue et al. |
| 5,795,668 A | 8/1998 | Banerjee |
| 5,902,696 A | 5/1999 | Smesko et al. |
| 6,242,135 B1 | 6/2001 | Mushiake |
| 6,299,668 B1 | 10/2001 | Penth et al. |
| 6,299,778 B1 | 10/2001 | Penth et al. |
| 6,309,545 B1 | 10/2001 | Penth et al. |
| 6,335,114 B1 | 1/2002 | Ueshima et al. |
| 6,340,379 B1 | 1/2002 | Penth et al. |
| 6,383,386 B1 | 5/2002 | Hying et al. |
| 6,548,590 B1 | 4/2003 | Koloski et al. |
| 6,620,320 B1 | 9/2003 | Hying et al. |

(Continued)

FOREIGN PATENT DOCUMENTS

DE 199 18 856 11/1999

(Continued)

*Primary Examiner* — Helen O Conley
(74) *Attorney, Agent, or Firm* — Oblon, Spivak, McClelland, Maier & Neustadt, L.L.P.

(57) ABSTRACT

The present invention relates to electrical separators and to a process for making them. An electrical separator is a separator used in batteries and other arrangements in which electrodes have to be separated from each other while maintaining ion conductivity for example. The separator is preferably a thin porous insulating material possessing high ion permeability, good mechanical strength and long-term stability to the chemicals and solvents used in the system, for example in the electrolyte of the battery. In batteries, the separator should fully electrically insulate the cathode from the anode. Moreover, the separator has to be permanently elastic and to follow movements in the system, for example in the electrode pack in the course of charging and discharging. This object is achieved by an electrical separator according to the invention, comprising a sheetlike flexible substrate having a multiplicity of openings and having a coating on and in said substrate, said substrate being a polymeric nonwoven and said coating being a porous electrically insulating ceramic coating, said separator being characterized by a thickness of less than 80 μm.

28 Claims, 1 Drawing Sheet

U.S. PATENT DOCUMENTS

| | | |
|---|---|---|
| 2002/0023419 A1 | 2/2002 | Penth et al. |
| 2002/0023874 A1 | 2/2002 | Penth et al. |
| 2002/0039648 A1 | 4/2002 | Horpel et al. |
| 2004/0028913 A1 | 2/2004 | Hennige et al. |
| 2004/0038105 A1 | 2/2004 | Hennige et al. |

FOREIGN PATENT DOCUMENTS

| | | |
|---|---|---|
| DE | 101 42 622 | 3/2003 |
| WO | 99/15262 | 4/1999 |
| WO | 99/57769 | 11/1999 |
| WO | 2004/021477 | 3/2004 |

Fig. 1

ELECTRIC SEPARATOR, METHOD FOR THE PRODUCTION AND USE THEREOF

An electrical separator is a separator used in batteries and other arrangements in which electrodes have to be separated from each other while maintaining ion conductivity for example.

The separator is a thin porous insulating material possessing high ion permeability, good mechanical strength and long-term stability to the chemicals and solvents used in the system, for example in the electrolyte of the battery. In batteries, the separator should fully electronically insulate the cathode from the anode. Moreover, the separator has to be permanently elastic and to follow movements in the system, for example in the electrode pack in the course of charging and discharging.

The separator is a crucial determinant of the use life of the arrangement in which it is used, for example a battery cell. The development of rechargeable batteries is therefore crucially dependent on the development of suitable separator materials.

General information about electrical separators and batteries may be found for example at J. O. Besenhard in "Handbook of Battery Materials" (VCH-Verlag, Weinheim 1999).

Separators in use at present consist predominantly of porous organic polymer films or of inorganic nonwoven materials, for example nonwovens of glass or ceramic materials or else ceramic papers. These are produced by various companies. Important producers include Celgard, Tonen, Ube, Asahi, Binzer, Mitsubishi, Daramic and others. A typical organic separator consists for example of polypropylene or of a polypropylene/polyethylene/polypropylene composite.

Disadvantages of these organic polyolefin separators are their relatively low thermal stability limit of distinctly below 150° C. and also their low chemical stability in inorganic lithium battery cells. When used in lithium batteries, polyolefins are gradually attacked by the lithium or the lithiated graphite. In systems comprising a polymer electrolyte, a dense oxidation product layer is therefore formed. It prevents further destruction of the separator in lithium ion batteries. This layer does not form in inorganic systems, so that total destruction occurs.

High energy batteries or high performance batteries can simply not be fabricated using polymer electrolytes, since their conductivity is too low at the operating temperatures in question. These battery systems utilize nonaqueous and non-polymeric electrolytes such as for example liquid sulfur dioxide. Polymeric separators are not chemically stable in these electrolytes, being destroyed after some time. These systems therefore utilize inorganic separators (glass nonwoven, ceramic nonwoven and ceramic paper) having the familiar disadvantages. These are in particular that inorganic ceramic or glass nonwovens cannot be machine processed into wound cells, since they always break at the given pulling tensions. Ceramic papers are very brittle and cannot be wound or processed into wound cells for that reason. Utility is therefore restricted to the production of prismatic cells, where the electrodes/separators are not wound but stacked. Nor is it necessary in this arrangement for the materials to have breaking strength.

There have been initial attempts to use inorganic composite materials as separators. For instance, DE 198 38 800 encompasses an electrical separator comprising a sheetlike flexible substrate having a multiplicity of openings and having a coating on said substrate, the separator being characterized in that the material of said substrate is selected from metals, alloys, plastics, glass and carbon fiber or a combination thereof and said coating is a two-dimensionally continuous porous electrically nonconducting ceramic coating. The separators, which have a support of electrically conductive material (as reported in the example), however, have been determined to be unsuitable for lithium ion cells, since the coating cannot be produced over a large area without flaws at the thickness described and consequently shortcircuiting can occur very easily.

It can be stated in summary that there is at present no suitable separator material for producing wound inorganic high performance or high energy batteries in an economical manner.

We were able to show in previous work (DE 101 42 622) that this is achieved by a material comprising a sheetlike flexible substrate having a multiplicity of openings and having a coating on and in said substrate, the material of said substrate being selected from woven or non-woven electrically nonconductive fibers of glass or ceramic or a combination thereof and said coating being a porous electrically insulating ceramic coating, the resulting separator having a thickness of less than 100 μm and being bendable, having a sufficiently low resistance in conjunction with the electrolyte and yet possessing sufficiently good long-term stability. But the resistance of these separators is still too high for a multiplicity of applications, since the substrate used is a woven glass fiber fabric which is firstly too thick and secondly insufficiently porous.

Moreover, this separator is not durable to strong bases as used in nickel metal hydride and silver-zinc and other systems as an electrolyte. Yet separator materials for such high performance systems have to be durable in strong bases (40% KOH, at up to at least 80° C. in some instances). True, polymeric separators based on polyolefins can be used here in principle (as is in fact the case at present), albeit with the familiar disadvantage of low thermal stability. By contrast, inorganic glassy materials or ceramic materials based on silicon or aluminum and having a higher thermal stability are soluble in the electrolyte.

It would be desirable to be able to use a both thermally and chemically stable separator for these systems as well. It is accordingly an object of the present invention to provide a separator which is thermally stabler than existing polymeric separators and chemically more durable than separators based on metal, glass or woven ceramic fabrics.

It has now been found in the course of the ongoing optimization of the properties of the separators described in DE 101 42 622 that, surprisingly, separators having the properties mentioned are achievable with polymeric substrate materials. This provides electrical separators comprising a sheetlike flexible substrate having a multiplicity of openings and having a coating on and in said substrate, the material of said substrate being selected from non-woven electrically nonconductive fibers of polymers and said coating being a porous electrically insulating ceramic coating. The separator has a thickness of less than 80 μm and is bendable and has a sufficiently low resistance in conjunction with an electrolyte and yet possesses sufficient long-term stability. The thermal stability of these separators is equal to that of the porous inorganic coating. The chemical stability to strong bases is obtained through the use of stable polymers such as for example polypropylene/polyethylene or polyacrylonitrile nonwoven and durable ceramic materials such as $ZrO_2$ and $TiO_2$.

The present invention accordingly provides an electrical separator comprising a sheetlike flexible substrate having a multiplicity of openings and having a porous inorganic coating on and in said substrate, the material of said substrate being selected from woven or non-woven electrically nonconductive fibers, characterized by said substrate comprising polymeric or natural fibers and having a porosity of more than 50%.

The present invention likewise provides a process for producing a separator according to the invention, which comprises providing a sheetlike flexible substrate having a multiplicity of openings with a coating on and in said substrate, the material of said substrate being selected from non-woven electrically nonconductive fibers of polymers and said coating being a porous electrically insulating ceramic coating.

In general, the larger the pores, the lower the resistance which ensues. Moreover, the porosity of the separator can be influenced through the choice of suitable particles, and this similarly leads to modified properties. A separator parameter which is frequently quoted in this context is the Gurley number. It is a measure of the gas permeability of the dry porous separator. As described by O. Besenhard in the Handbook of Battery Materials, the conductivity of a known system can be inferred directly from the Gurley number. In generalized terms, a higher gas permeability (Gurley number) will result in a higher conductivity for the wetted separator in the battery cell. The Gurley numbers of commercially available separators range from 10, when the pore diameter is around 0.1 µm, to 30, when the pore diameter is around 0.05 µm (G. Venugiopal; J. of Power Sources 77 (1999) 34-41).

However, it must always be borne in mind that an extremely small Gurley number can also be evidence of defects, i.e. large holes, in the separator. These defects can lead to an internal short circuit in operation of a battery. The battery can then very rapidly self-discharge in a hazardous reaction. In the process, large electric currents occur that may even cause a contained battery cell to explode in the extreme case. For this reason, the separator can make a decisive contribution to the safety, or lack of safety, of a high-energy battery. Therefore, the separator is a decisive structural component of a battery and deserving of a great deal of attention.

Polymeric separators do provide for example the safety performance required at present for lithium batteries by impeding any ionic transport between the electrodes beyond a shutdown temperature, which is about 120° C. This is because, at this temperature, the pore structure of the separator collapses and all the pores close up. As a result of ionic transport being stopped, the hazardous reaction which can lead to an explosion ceases. However, if the cell is further heated owing to external circumstances, the breakdown temperature is exceeded at about 150 to 180° C. At this temperature, the separator starts to melt and contract. The two electrodes then come into direct contact at many locations in the battery cell and so there is an internal short circuit over a large area. This leads to an uncontrolled reaction which ends with the cell exploding, or the resultant pressure is released by an overpressure valve (a bursting disk), frequently with signs of fire.

The separator of the present invention is a hybrid separator in that it comprises inorganic components and a polymeric base material. Shutdown, then, occurs with the hybrid separator of the present invention when, owing to the high temperature, the polymeric structure of the base material melts and penetrates into the pores of the inorganic material, thereby closing them. Meltdown, however, does not occur with the separator of the present invention. By virtue of its shutdown mechanism in the battery cells, the separator of the present invention thus meets the requirements, voiced by various battery manufacturers, for a safety switchoff mechanism. The inorganic particles ensure that there can never be a meltdown. It is thus ensured that there can never be a large-area short circuit.

If a shutdown mechanism is absolutely necessary for practical use, this can also be achieved for example by equipping the surface and/or the pores of the ceramic or hybrid separator of the present invention with a material which, on attainment of the temperature limit, occludes the pores and prevents continued ion flux. This can be accomplished for example by means of a polymer or wax whose melting point is in that range.

The separator of the present invention is also very safe in the event of an internal short circuit due to an accident for example. If, for example, a nail were to puncture a battery, the following would happen, depending on the type of separator: a polymeric separator would melt at the site of puncture (a short circuit current flows through the nail and causes it to heat up) and contract. As a result, the short circuit location would become larger and larger and the reaction could get out of control. Only the polymeric substrate material would melt in the hybrid separator of the present invention, if at all, but not the inorganic separator material. So the reaction in the interior of the battery cell following such an accident would proceed much more moderately. This battery is thus distinctly safer than one with a polymeric separator. This is an important factor in mobile applications in particular.

A further, not inconsiderable advantage of the hybrid separator of the present invention is its very good wettability. Owing to the hydrophilic ceramic coating, the wetting with electrolytes proceeds very rapidly. In the case of less hydrophilic electrolytes, however, the surface can also be made specifically more hydrophobic. This means that the batteries are quick and hence also economical to manufacture.

The separator of the present invention also has a distinct cost advantage over separators based on woven glass or ceramic fabrics as described in DE 101 42 622 for example. One reason for this, in addition to the widely disparate material costs, is that the polymeric substrate is substantially simpler to handle than woven glass or ceramic fabric, which, after all, has a certain brittleness and is destroyed by careless handling. The entire manufacturing operation is therefore less convenient and hence more cost intensive.

The separator of the present invention will now be described without the invention being limited thereto.

The electrical separators of the present invention comprise a sheetlike flexible substrate having a multiplicity of openings and a porous inorganic coating on and in said substrate, the material of said substrate being selected from woven or non-woven electrically nonconductive fibers and are characterized by said substrate comprising polymeric or natural fibers and having a porosity of more than 50%. The porosity of the substrate is preferably in the range from 50% to 97%, more preferably in the range from 75% to 90% and most preferably in the range from 80% to 90%. Porosity in this context is defined as the volume of the nonwoven (100%) minus the volume of the fibers of the nonwoven, i.e. the fraction of the volume of the nonwoven that is not taken up by material. The volume of the nonwoven can be calculated from the dimensions of the nonwoven. The volume of the fibers is calculated from the measured weight of the nonwoven in question and the density of the polymeric fibers. The large porosity of the substrate also means a higher porosity for the hybrid separator of the present invention, which is why a higher uptake of electrolytes is obtainable with the separator of the present invention.

The separators of the present invention are preferably less than 80 µm, more preferably less than 75 µm, even more preferably from 10 to 75 μm and most preferably from 20 to 50 μm in thickness. The low thickness ensures a particularly low electrical resistance on the part of the separator when used with an electrolyte. The separator itself naturally has a very high electrical resistance, since it itself must have insulating properties.

To be able to obtain a separator having insulating properties, the material for its substrate preferably comprises electrically nonconductive fibers of polymers which are preferably selected from polyacrylonitrile (PAN), polyester, polyamide (PA), polyimide (PI), polytetrafluoroethylene (PTFE) and/or polyolefin (PO), for example polypropylene (PP) or polyethylene (PE) or mixtures thereof. All other polymers which are stable in these very reactive media and also stable natural fibers can be used as well, but those mentioned above are particularly preferred materials. In lithium batteries, the separator has to withstand very strongly reducing conditions, while it has to withstand strongly alkaline conditions in nickel/metal hydride or Ag/Zn batteries.

The polymeric fibers are preferably from 1 to 25 μm and more preferably from 2 to 15 μm in diameter.

The material of the substrate is selected from woven or non-woven polymeric fibers. Woven polymeric fibers can be woven fabrics for example. Non-woven polymeric fibers can be for example formed-loop knits, nonwovens or felts. Particular preference is given to the material of the flexible substrate being a nonwoven comprising polymeric fibers. The use of a nonwoven, preferably a very thin and homogeneous nonwoven material, ensures a uniform resistance in use with an electrolyte. Nonwovens have the advantage of having a distinctly higher porosity than comparable wovens.

The substrate, especially the nonwoven, is preferably from 15 to 80 μm, more preferably from 25 to 50 μm and most preferably from 15 to 40 μm in thickness. The thickness of the substrate has a substantial influence on the properties of the separator, since not only the flexibility but also the sheet resistance of the electrolyte-saturated separator is dependent on the thickness of the substrate. In addition, thinner separators permit an increased packing density in a battery stack, so that a larger amount of energy can be stored in the same volume. Furthermore, the limiting current density can likewise be increased as a result, through enlargement of the electrode area.

The separator of the present invention comprises a porous electrically insulating ceramic coating. It can be advantageous for the coating which is present on and in the substrate to comprise an electrically nonconductive oxide of the metals Al, Zr, Si, Sn, Ti and/or Y. The porosity of the separator is preferably in the range from 10% to 70%, more preferably in the range from 20% to 60% and most preferably in the range from 30% to 50%. Porosity as understood here relates to the accessible, i.e. open, pores. Porosity can be determined via the familiar method of mercury porosimetry or can be calculated from the volume and the density of the materials used on the assumption that all the pores are open pores. The coating present on and in the substrate more preferably comprises an oxide of the metals Al, Zr and/or Si.

The separators of the present invention are characterized by a breaking strength of at least 1 N/cm, preferably at least 3 N/cm and most preferably more than 6 N/cm. The separators of the present invention are preferably bendable around a radius down to 100 m, more preferably down to 50 mm and most preferably down to 2 mm, without damage. The high breaking strength and the good bendability of the separator of the present invention has the advantage that the separator is able to follow the changes in electrode geometry which occur in the course of battery charging and discharging without the separator being damaged. The bendability also has the advantage that this separator can be used to produce commercially standardized wound cells. In these cells, the electrode/separator plies are wound up together in spirals of a standardized size and contacted.

The separator of the present invention is preferably obtainable by a process for producing a separator that comprises providing a sheetlike flexible substrate having a multiplicity of openings with a coating on and in said substrate, the material of said substrate being selected from woven or non-woven electrically nonconductive fibers of polymers and said coating being a porous, electrically insulating, ceramic coating.

The coating is preferably applied to the substrate by applying to said substrate a suspension comprising at least one electrically nonconductive or only very poorly conductive oxide of the metals Al, Zr, Si, Sn, Ti and/or Y and a sol and heating one or more times to solidify said suspension on or in or else on and in the support. The process itself is known from WO 99/15262, but not all of the parameters and starting materials, especially electrically nonconductive starting materials, can be used for producing the separator of the invention. The choice of starting materials also dictates certain process parameters which first had to be found for the combinations of materials useful as a separator.

Said suspension is brought onto and into said substrate for example by printing on, pressing on, pressing in, rolling on, knifecoating on, spreadcoating on, dipping, spraying or pouring on.

The material of the substrate is preferably selected from polymeric fiber nonwovens from 10 to 200 μm in thickness. It can be particularly advantageous for the membrane of the present invention to comprise a substrate from 30 to 100 μm and preferably from 25 to 50 μm in thickness.

The polymeric fibers are preferably selected from polyacrylonitrile, polyamides, polyimides, polyacrylates, polytetrafluoroethylene, polyesters, for example polyethylene terephthalate, and/or polyolefins. But all other known polymeric fibers and many natural fibers can be used as well. The membrane of the present invention preferably comprises polymeric fibers which have a softening temperature of more than 100° C. and a melting temperature of more than 110° C. The range of possible uses is smaller in the case of polymeric fibers having lower temperature limits. Preferred membranes can be employed at up to a temperature of up to 150° C., preferably at up to a temperature of from 120 to 150° C. and most preferably at up to a temperature of 121° C. It can be advantageous for the polymeric fibers to be from 1 to 25 μm and preferably from 2 to 15 μm in diameter. Were the polymeric fibers to be distinctly thicker than the ranges mentioned, the flexibility of the substrate and hence also of the separator would suffer.

The suspension used for preparing the coating comprises at least one inorganic oxide of aluminum, of silicon and/or of zirconium and at least one sol, at least one semimetal oxide sol or at least one mixed metal oxide sol or a mixture thereof, and is prepared by suspending at least one inorganic component in at least one of these sols.

The sols are obtained by hydrolyzing at least one compound, preferably at least one metal compound, at least one semimetal compound or at least one mixed metal compound. It can be similarly advantageous to introduce the compound to be hydrolyzed into an alcohol or an acid or a combination of these liquids prior to hydrolysis. The compound to be hydrolyzed is preferably at least one metal nitrate, a metal chloride, a metal carbonate, a metal alkoxide compound or at least one semimetal alkoxide compound, more preferably at least one metal alkoxide compound. The metal alkoxide compound or semimetal alkoxide compound hydrolyzed is preferably an alkoxide compound of the elements Zr, Al, Si, Ti and Y or at least one metal nitrate, metal carbonate or metal halide selected from the metal salts of the elements Zr, Al, Si and Ti as a metal compound. The hydrolysis is preferably carried out in the presence of liquid water, water vapor, ice or an acid or a combination thereof.

One embodiment of the process of the present invention comprises preparing particulate sols by hydrolysis of the compounds to be hydrolyzed. These particulate sols are notable for the compounds formed by hydrolysis being present in the sol in particulate form. The particulate sols can be prepared as described above or as in WO 99/15262. These sols customarily have a very high water content, which is preferably above 50% by weight. It can be advantageous for the compound to be hydrolyzed to be introduced into alcohol or an acid or a combination thereof prior to hydrolysis. The hydrolyzed compound may be peptized by treatment with at least one organic or inorganic acid, preferably with a 10-60% organic or inorganic acid, particularly preferably with a mineral acid selected from sulfuric acid, hydrochloric acid, perchloric acid, phosphoric acid and nitric acid or a mixture thereof. The particulate sols thus prepared can subsequently be used for preparing suspensions, in which case it is preferable to prepare suspensions for application to natural fiber nonwovens or to polymeric sol pretreated polymeric fiber nonwovens.

In a further embodiment of the process of the present invention, hydrolysis of the compounds to be hydrolyzed is used to prepare polymeric sols. These polymeric sols are notable for the fact that the compounds formed by hydrolysis are present in the sol in polymeric form, i.e. in the form of chains crosslinked across a relatively large space. The polymeric sols customarily include less than 50% by weight and preferably much less than 20% by weight of water and/or aqueous acid. To obtain the preferred fraction of water and/or aqueous acid, the hydrolysis is preferably carried out in such a way that the compound to be hydrolyzed is hydrolyzed with from 0.5 to 10 times the molar ratio and preferably with half the molar ratio of liquid water, water vapor or ice, based on the hydrolyzable group of the hydrolyzable compound. The amount of water used can be up to 10 times in the case of compounds which are very slow to hydrolyze, such as tetraethoxysilane. Compounds which are very fast to hydrolyze, such as zirconium tetraethoxide, are perfectly capable under these conditions of forming particulate sols as it is, which is why it is preferable to use 0.5 times the amount of water to hydrolyze such compounds. A hydrolysis with less than the preferred amount of liquid water, water vapor or ice likewise leads to good results, although using more than 50% less than the preferred amount of half the molar ratio is possible but not very sensible, since hydrolysis would no longer be complete and coatings based on such sols would not be very stable using an amount below this value.

To prepare these sols having the desired, very low fraction of water and/or acid in the sol, it can be advantageous for the compound to be hydrolyzed to be dissolved in an organic solvent, especially ethanol, isopropanol, butanol, amyl alcohol, hexane, cyclohexane, ethyl acetate and/or mixtures thereof, before the actual hydrolysis is carried out. A sol thus prepared can be used for preparing the suspension of the present invention or as an adhesion promoter in a pretreatment step.

Both the particulate sols and the polymeric sols can be used as a sol to prepare the suspension in the process of the present invention. Not just sols which are obtainable as just described can be used, but in principle also commercially available sols, for example zirconium nitrate sol or silica sol. The process of preparing separators by applying a suspension to and solidifying it on a carrier is known per Se from DE 101 42 622 and in similar form from WO 99/15262, but not all the parameters and ingredients are applicable to the preparation of the membrane of the present invention. More particularly, the operation described in WO 99/15262 is not fully applicable to polymeric nonwoven materials in this form, since the very watery sol systems described therein frequently do not provide complete, in-depth wetting of the customarily hydrophobic polymeric nonwovens, since most polymeric nonwovens are only badly wetted by the very watery sol systems, if at all. It has been determined that even the minutest unwetted areas in the nonwoven material can lead to membranes or separators being obtained that have defects and hence are inutile.

It has now been found that, surprisingly, a sol system or suspension whose wetting behavior has been adapted to the polymers will completely penetrate the nonwoven materials and so provide defect-free coatings. In the process of the present invention, it is therefore preferable to adapt the wetting behavior of the sol or suspension. This is preferably accomplished by preparing polymeric sols or suspensions from polymeric sols, these sols comprising one or more alcohols, for example methanol, ethanol or propanol, or mixtures comprising one or more alcohols and also preferably aliphatic hydrocarbons. But other solvent mixtures are also conceivable for addition to the sol or suspension in order that the wetting behavior thereof may be adapted to the substrate used.

It has been determined that the fundamental change in the sol system and of the suspension resulting therefrom leads to a distinct improvement in the adhesion properties of the ceramic components on the and in a polymeric nonwoven material. Such good adhesion strengths are normally not obtainable with particulate sol systems. Preference is therefore given to coating substrates comprising polymeric fibers using suspensions which are based on polymeric sols or were finished with an adhesion promoter in a preceding step by treatment with a polymeric sol.

It can be advantageous for the suspension to be prepared by using an inorganic component comprising at least one oxide selected from the oxides of the elements Y, Zr, Al, Si, Sn and Ti and suspended in a sol. Preference is given to suspending an inorganic component which comprises at least one compound selected from aluminum oxide, titanium dioxide, zirconium oxide and/or silicon dioxide. The mass fraction of the suspended component is preferably from 0.1 to 500 times, more preferably from 1 to 50 times, and most preferably from 5 to 25 times that of the sol used.

It can be advantageous to suspend in at least one sol at least one inorganic component having an average particle size of from 1 to 10 000 nm, preferably from 1 to 10 nm, from 10 to 100 nm, from 100 to 1 000 nm or from 1 000 to 10 000 nm, more preferably from 250 to 1 750 nm and most preferably from 300 to 1 250 nm. The use of inorganic components having an average particle size of from 250 to 1 250 nm confers a particularly highly suitable bendability and porosity on the membrane.

To improve the adhesion of the inorganic components to polymeric fibers as a substrate, it can be advantageous for the suspensions used to be admixed with adhesion promoters, for example organofunctional silanes or else pure oxides such as $ZrO_2$, $TiO_2$, $SiO_2$ or $Al_2O_3$, in which case it is preferable to admix the adhesion promoters to suspensions based on polymeric sols. Useful adhesion promoters include in particular compounds selected from the octylsilanes, the fluorinated octylsilanes, the vinylsilanes, the amine-functionalized silanes and/or the glycidyl-functionalized silanes, for example the Dynasilanes from Degussa. Particularly preferred adhesion promoters for polytetrafluoroethylene (PTFE) include for example fluorinated octylsilanes, for polyethylene (PE) and polypropylene (PP) they are vinyl-, methyl- and octylsilanes, although an exclusive use of methylsilanes is not optimal, for polyamides and polyamines they are amine-functional silanes, for polyacrylates and polyesters they are glycidyl-functionalized silanes and for polyacrylonitrile it is also possible to use glycidyl-functionalized silanes. Other adhesion promoters can be used as well, but they have to be adapted to the respective polymers. The WO 99/15262 addition of methyltriethoxysilane to the sol system in the coating of polymeric carrier materials is a comparatively bad solution to the adhesivity problem of ceramic on polymeric fibers. Furthermore, the drying time of from 30 to 120 min at from 60 to 100° C. in the case of the sol systems described is not sufficient to obtain hydrolysis-resistant ceramic materials. In other words, these materials dissolve or become damaged in the course of prolonged storage in aqueous media. On the other hand, the thermal treatment at above 350° C. that is described in WO 99/15262 would lead to an incineration of the polymeric nonwoven used here and hence to the destruction of the membrane. The adhesion promoters accordingly have to be selected so that the solidification temperature is below the melting or softening temperature of the polymer and below its decomposition temperature. Suspensions according to the present invention preferably include distinctly less than 25% by weight and more preferably less than 10% by weight of compounds capable of acting as adhesion promoters. An optimal fraction of adhesion promoter results from coating the fibers and/or particles with a monomolecular layer of the adhesion promoter. The amount in grams of adhesion promoter required for this purpose can be obtained by multiplying the amount in g of the oxides or fibers used by the specific surface area of the materials in $m^2g^{-1}$ and then dividing by the specific area required by the adhesion promoter in $m^2g^{-1}$, the specific area required frequently being in the order of from 300 to 400 $m^2g^{-1}$.

The table which follows contains an illustrative overview of usable adhesion promoters based on organofunctional silicon compounds for typical nonwoven material polymers.

| Polymer | Organofunctional type | Adhesion promoter |
|---------|----------------------|-------------------|
| PAN     | Glycidyl             | GLYMO             |
|         | Methacryloyl         | MEMO              |
| PA      | Amino                | AMEO, DAMO        |
| PET     | Methacryloyl         | MEMO              |
|         | Vinyl                | VTMO, VTEO, VTMOEO |
| PE, PP  | Amino                | AMEO, AMMO        |
|         | Vinyl                | VTMO, VTEO, Silfin |
|         | Methacryloyl         | MEMO              | where:
AMEO = 3-aminopropyltriethoxysilane
DAMO = 2-aminoethyl-3-aminopropyltrimethoxysilane
GLYMO = 3-glycidyloxytrimethoxysilane
MEMO = 3-methacryloyloxypropyltrimethoxysilane
Silfin = vinylsilane + initiator + catalyst
VTEO = vinyltriethoxysilane
VTMO = vinyltrimethoxysilane
VTMOEO = vinyltris(2-methoxyethoxy)silane The coatings according to the present invention are applied to the substrate by solidifying the suspension in and on the substrate. According to the present invention, the suspension present on and in the substrate can be solidified by heating at from 50 to 350° C. Since the maximum temperature is dictated by the substrate used when polymeric substrate materials are used, the maximum temperature must be adapted accordingly. Thus, depending upon the embodiment of the process according to the present invention, the suspension present on and in the substrate is solidified by heating at from 100 to 350° C. and most preferably by heating at from 110 to 280° C. It can be advantageous for the heating to take place at from 100 to 350° C. for from 1 second to 60 minutes. It is more preferable to solidify the suspension by heating at from 110 to 300° C. and most preferably at from 110 to 280° C. and preferably for from 0.5 to 10 min.

Depending on the temperature level chosen to solidify the separator, some polymer materials may undergo changes in their chemical structure under the thermal influence, so that the polymers are subsequently no longer present in their original state or original modification. For instance, polyimides may partially carbonize and polyacrylonitrile may form so-called ladder polymers which subsequently undergo a partial carbonization. These effects will always lead to a change in the properties of the carrier materials. This can also be specifically intended, depending on the intended application, since, for example, the solvent, acid and alkali resistance may be enhanced as a result. The degree of transformation involved can be affected by the temperature and the time.

The assembly may be heated according to the present invention by means of heated air, hot air, infrared radiation or by other heating methods according to the prior art.

In a particular embodiment of the process according to the present invention, the abovementioned adhesion promoters are applied to the substrate, especially to the polymeric nonwoven, in a preceding step. To this end, the adhesion promoters are dissolved in a suitable solvent, for example ethanol. This solution may additionally include a small amount of water, preferably from 0.5 to 10 times the molar amount of the hydrolyzable group, and small amounts of an acid, for example HCl or $HNO_3$, as a catalyst for the hydrolysis and condensation of the Si—OR groups. This solution is applied to the substrate by the familiar techniques, for example spraying on, printing on, pressing on, pressing in, rolling on, knifecoating on, spreadcoating on, dipping, spraying or pouring on, and the adhesion promoter is fixed on the substrate by a thermal treatment at from 50 to not more than 350° C. It is only after the adhesion promoter has been applied that this embodiment of the process according to the present invention has the suspension being applied and solidified.

In another embodiment of the process according to the present invention, adhesion-promoting layers are applied in a pretreatment step in which a polymeric sol is applied and solidified. The polymeric sol is preferably applied and solidified in the same way as the suspensions are applied and solidified. Application of these polymeric sols renders the substrates, especially the polymeric nonwovens, finished with an oxide of Al, Ti, Zr or Si as an adhesion promoter and so renders the substrate hydrophilic. Thus rendered substrates can then be given a porous coating as described in WO 99/15262 or as described above, and this coating can be observed to possess distinctly better adhesion, especially to polymeric nonwovens, as a result of the pretreatment.

A typical polymeric sol for a pretreatment is an approximately 2-10% by weight alcoholic solution of a metal alkoxide (eg titanium ethoxide or zirconium propoxide) which may additionally include from 0.5 to 10 mol fractions of water and also small amounts of an acid as a catalyst. After such a sol has been applied to the substrate, the substrates, preferably polymeric nonwovens, are treated at a temperature of not more than 350° C. This will cause a dense film of a metal oxide to form around the substrate fibers, making it possible to infiltrate the substrate with a suspension or slip based on a commercial zirconium nitrate sol or silica sol without wetting problems.

Since polymeric sols are more likely to form dense films than particulate sols and, what is more, particulate sols always have relatively large amounts of water in the pore microstructure of the interstitial volumes, it is simpler to dry polymeric sols than particulate sols. Nevertheless, the membranes have to be dried at temperatures of above 150° C. in order that the ceramic material may acquire sufficiently good adhesion to the carrier. Particularly good adhesive strengths are obtainable at a temperature of at least 200° C. and very good strengths at least 250° C. However, in that case, it is absolutely vital to use polymers of appropriate thermal stability, for example polyethylene terephthalate (PET), polyacrylonitrile (PAN), polytetrafluoroethylene (PTFE), polyvinylidene fluoride (PVDF) or polyamide (PA). If the carrier does not possess sufficient thermal stability, the membrane can initially be preconsolidated by predrying it at a lower temperature (up to 100° C.). When the supplementary consolidation is then carried out at an elevated temperature, the ceramic layer acts as a prop for the support, so that the substrate can no longer simply melt away. These process parameters hold not only for the application and solidification of a polymeric sol, for example as an adhesion promoter, but also for the application and solidification of suspensions based on polymeric sols.

Both forms of applying an adhesion promoter prior to the actual application of the suspension provide improved adhesivity of the substrates especially with regard to aqueous particulate sols, which is why especially thus pretreated substrates can be coated according to the present invention with suspensions based on commercially available sols, for example zirconium nitrate sol or silica sol. But this way of applying an adhesion promoter also means that the production process of the membrane according to the present invention has to be extended to include an intervening or preliminary treatment step. This is feasible albeit more costly and inconvenient than the use of adapted sols to which adhesion promoters have been added, but also has the advantage that better results are obtained on using suspensions based on commercially available sols.

The process according to the present invention can be carried out for example by unrolling the substrate off a roll, passing it at a speed of from 1 m/h to 2 m/s, preferably at a speed of from 0.5 m/min to 20 m/min and most preferably at a speed of from 1 m/min to 5 m/min through at least one apparatus which applies the suspension atop and into the support, for example a roll, and at least one further apparatus whereby the suspension is solidified on and in the support by heating, for example an electrically heated furnace, and rolling the separator thus produced up on a second roll. This makes it possible to produce the separator according to the present invention in a continuous process. Similarly, the pretreatment steps can be carried out on a continuous basis by observing the parameters mentioned.

Hybrid separators according to the present invention can be used as separators in batteries. When the separator is used according to the invention as a separator in batteries, the separator is customarily placed between the anode and the cathode in the electrolyte-saturated form.

The separator of the present invention is suitable for primary and secondary (rechargeable) lithium batteries, for nickel metal hydride, nickel-cadmium, silver-zinc and zinc-air batteries. The separator according to the present invention is also useful as a separator in batteries which utilize the $Li/LiAlCl_4 \times SO_2/LiCoO_2$ system. But the separator according to the invention is also useful in all other battery systems not mentioned here. The separator according to the present invention is particularly useful in battery systems having comparatively high permitted operating temperatures.

The separators according to the present invention are similarly useful in batteries having a fast charging cycle. By virtue of the high thermal stability of the separator according to the present invention, a battery equipped with this separator is not so thermally sensitive and therefore is able to better tolerate the temperature increase due to the rapid charging without adverse changes to the separator or damage to the battery. These batteries consequently have a distinctly faster charging cycle. This is a distinct advantage when thus equipped batteries are used in electric vehicles, since they no longer have to be charged for more than 12 hours or even longer and instead charging is feasible within distinctly shorter periods of time.

Various chemical and engineering requirements can be met by adapting the starting materials or by aftertreating the ceramic layer.

For instance, a hydrophilic or hydrophobic coating can be produced by aftertreatment or by reaction with appropriate chemical groups which are known to one skilled in the art. This can be accomplished for example with organotrialkoxy compounds of silicon. These can be applied either together with the application of the ceramic material to the substrate or else after the separator has been formed.

The separator can be optimized for systems involving strongly alkaline electrolytes by choosing particularly alkali-resistant input materials. Zirconium oxide or titanium dioxide is used instead of aluminum oxide or silicon dioxide as an inorganic component. The nonwoven should then also be composed of a polyolefin or of polyacrylonitrile and not of polyester.

The present invention accordingly also provides lithium batteries, nickel metal hydride batteries, nickel-cadmium batteries, silver-zinc batteries and zinc-air batteries comprising a separator according to the present invention.

FIG. 1 is a graph illustrating the charging behavior of a lithium ion cell as per example 13. The cycle number is plotted on the X-axis, the specific load in Ah/kg is plotted on the Y-axis. The top curve represents the total capacity, and the bottom curve the charge capacity at a constant current I. The charging voltage was increased from 4.1 to 4.2 volts at cycle number 92. This results in an increased total capacity and also an increased charge capacity at a constant current I.

The nonlimiting examples which follow illustrate the present invention.

EXAMPLE 1

Preparation of an S450PET Separator

To 160 g of ethanol are initially added 15 g of a 5% by weight aqueous HCl solution, 10 g of tetraethoxysilane, 2.5 g of methyltriethoxysilane and 7.5 g of GLYMO Dynasilane (Degussa AG). This sol, which was initially stirred for some hours, is then used to suspend 125 g each of Martoxid MZS-1 and Martoxid MZS-3 aluminas from Martinswerke. This slip is homogenized with a magnetic stirrer for at least a further 24 h, during which the stirred vessel has to be covered over in order that solvent may not escape.

This slip is then used to coat a PET nonwoven about 30 μm in thickness and about 20 g/m² in basis weight in a continuous roll coating process at a belt speed of about 8 m/h and T=200° C. In this roll coating process, the slip is coated onto the nonwoven using a roll turning opposite to the belt direction (the direction of movement of the nonwoven). The nonwoven subsequently passes through an oven at the stated temperature. The same method and apparatus are employed in the runs which follow. The end result obtained is a separator having an average pore size of 450 nm.

EXAMPLE 2

Preparation of an S240PAN Separator

To 160 g of ethanol are initially added 15 g of a 5% by weight aqueous HCl solution, 10 g of tetraethoxysilane, 2.5 g of methyltriethoxysilane and 7.5 g of GLYMO Dynasilane. This sol, which was initially stirred for some hours, is then used to suspend 280 g of AlCoA CT1200 SG alumina.

This slip is homogenized with a magnetic stirrer for at least a further 24 h, during which the stirred vessel has to be covered over in order that solvent may not escape.

This slip is then used to coat a PAN nonwoven (Viledon 1773 from Freudenberg) about 100 μm in thickness and 22 g/m² in basis weight in a continuous roll coating process at a belt speed of about 8 m/h and T=250° C. The end result is a separator having an average pore size of 240 nm.

EXAMPLE 3

Preparation of an S450PO Separator

To 160 g of ethanol are initially added 15 g of a 5% by weight aqueous HCl solution, 10 g of tetraethoxysilane, 2.5 g of methyltriethoxysilane and 7.5 g of GLYMO Dynasilane. This sol, which was initially stirred for some hours, is then used to suspend 125 g each of Martoxid MZS-1 and Martoxid MZS-3 aluminas. This slip is homogenized with a magnetic stirrer for at least a further 24 h, during which the stirred vessel has to be covered over in order that solvent may not escape.

A PO nonwoven (FS 2202-03 from Freudenberg) about 30 μm in thickness is coated with the above slip in a continuous roll coating process at a belt speed of about 8 m/h and T=110° C. The end result is a separator having an average pore size of 450 nm.

EXAMPLE 4

Preparation of an S100PET Separator

To 160 g of ethanol are initially added 15 g of a 5% by weight aqueous HCl solution, 10 g of tetraethoxysilane, 2.5 g of methyltriethoxysilane and 7.5 g of GLYMO Dynasilane. This sol, which was initially stirred for some hours, is then used to suspend 280 g of AlCoA CT3000 alumina. This slip is homogenized with a magnetic stirrer for at least a further 24 h, during which the stirred vessel has to be covered over in order that solvent may not escape.

The above slip is then used to coat a PET nonwoven about 30 μm in thickness and about 20 g/m² in basis weight in a continuous roll coating process at a belt speed of about 8 m/h and T=200° C. The end result is a separator having an average pore size of 100 nm.

EXAMPLE 5

Preparation of an S100PAN Separator

To 160 g of ethanol are initially added 15 g of a 5% by weight aqueous HCl solution, 10 g of tetraethoxysilane, 2.5 g of methyltriethoxysilane and 7.5 g of GLYMO Dynasilane. This sol, which was initially stirred for some hours, is then used to suspend 300 g of AlCoA CT3000 alumina. This slip is homogenized with a magnetic stirrer for at least a further 24 h, during which the stirred vessel has to be covered over in order that solvent may not escape.

The above slip is then used to coat a PAN nonwoven (Viledon 1773 from Freudenberg) about 100 μm in thickness and 22 g/m² in basis weight in a continuous roll coating process at a belt speed of about 8 m/h and T=250° C. The end result is a separator having an average pore size of 100 nm.

EXAMPLE 6

Preparation of an S450PAN Separator

To 160 g of ethanol are initially added 15 g of a 5% by weight aqueous HCl solution, 10 g of tetraethoxysilane, 2.5 g of methyltriethoxysilane and 7.5 g of MEMO Dynasilane. This sol, which was initially stirred for some hours, is then used to suspend 140 g each of Martoxid MZS-1 and Martoxid MZS-3 aluminas. This slip is homogenized with a magnetic stirrer for at least a further 24 h, during which the stirred vessel has to be covered over in order that solvent may not escape.

The above slip is then used to coat a PAN nonwoven (Viledon 1773 from Freudenberg) about 100 μm in thickness and 22 g/m² in basis weight in a continuous roll coating process at a belt speed of about 8 m/h and T=250° C. The end result is a separator having an average pore size of 450 nm possessing better adhesivity than described in example 2.

EXAMPLE 7

Preparation of an S450PET Separator

To 160 g of ethanol are initially added 15 g of a 5% by weight aqueous HCl solution, 10 g of tetraethoxysilane, 2.5 g of methyltriethoxysilane and 7.5 g of MEMO Dynasilane. This sol, which was initially stirred for some hours, is then used to suspend 130 g each of Martoxid MZS-1 and Martoxid MZS-3 aluminas. This slip is homogenized with a magnetic stirrer for at least a further 24 h, during which the stirred vessel has to be covered over in order that solvent may not escape.

The above slip is used to coat a PET nonwoven about 30 μm in thickness and about 20 g/m² in basis weight in a continuous roll coating process at a belt speed of about 8 m/h and T=200° C. The end result is a separator having an average pore size of 450 nm possessing better adhesivity than described in example 1.

EXAMPLE 8

Preparation of a Z450PAN Separator 10 g of a 70% by weight solution of zirconium propoxide in propanol are dissolved in 340 g of propanol. This solution is admixed with 0.72 g of water and 0.04 g of concentrated hydrochloric acid by vigorous stirring. Stirring of this sol is continued for some hours.

This sol is then used to coat a PAN nonwoven (Viledon 1773 from Freudenberg) about 100 μm in thickness and 22 g/m² in basis weight in a continuous roll coating process at a belt speed of about 8 m/h and T=200° C.

1.4 g of zirconium acetylacetonate are dissolved in a mixture of 150 g of deionized water and 22.5 g of ethanol. 140 g each of MZS-1 and MZS-3 are suspended in this solution and the slip is stirred for at least 24 h. About 1 hour prior to the coating step, a further 75 g of a commercial 30% by weight zirconium nitrate sol from MEL Chemicals are added to the slip.

The precoated PAN nonwoven is then coated with this slip in a second continuous roll coating process at a belt speed of about 8 m/h and T=250° C. The end result is a separator having an average pore size of 450 nm, possessing very good adhesivity and excellent resistance even in very alkaline media (pH>10).

EXAMPLE 9

Gurley Numbers of Inventive Separators

The Gurley numbers summarized in table 2 hereinbelow were determined for the various separators of examples 1 to 8 by the method described in G. Venugopal; J. of Power Sources 77 (1999) 34-41.

TABLE 2

| Example: | Material | Gurley number |
|---|---|---|
| 1 and 7 | S 450 PET | 2 |
| 8 | Z 450 PAN | 3 |
| 6 | S 450 PAN | 3 |
| 3 | S 450 PO | 2.5 |
| 2 | S 240 PAN | 4 |
| 4 | S 100 PET | 8 |
| 5 | S 100 PAN | 13 |

EXAMPLE 10

Wettability of Inventive Separators

A separator as per example 7 is contacted with a solvent or solvent-electrolyte mixture. Initially, the time is measured by which the solvent has wetted a height of 1 cm. This takes about 180 sec when using propylene carbonate and about 1 450 sec when using ethylene carbonate/2M $LiClO_4$. The separator is thus very readily wettable. Many organic separators are virtually unwettable with ethylene carbonate/2M $LiClO_4$.

The dry separators take up propylene carbonate to 72% and ethylene carbonate/2M $LiClO_4$ to 148% of their dry weight.

EXAMPLE 11

Conductivity of Electrolyte-Infiltrated Separators

The separators prepared as per examples 4 and 7 are infiltrated with $LiPF_6$. Thereafter, the conductivity is determined using impedance spectroscopy. A value of about 6 $\Omega cm^2$ is found for the S100PET separator of example 4 and a value of 5 $\Omega cm^2$ is found for the S450PET separator of example 7.

EXAMPLE 12

Alkaline Cell with ZZ240PAN 10 g of a 70% by weight solution of zirconium propoxide in propanol are dissolved in 340 g of propanol. This solution is admixed with 0.72 g of water and 0.04 g of concentrated hydrochloric acid, each added with vigorous stirring. Thereafter, stirring of this sol is continued for some hours.

This sol is used to coat a PAN nonwoven about 50 μm in thickness and about 25 g/m² in basis weight in a continuous roll coating process at a belt speed of about 8 m/h and T=200° C.

1.4 g of zirconium acetylacetonate are dissolved in a mixture of 150 g of deionized water and 22.5 g of ethanol. 280 g of SC105 zirconium oxide are suspended in this solution and the slip is stirred for at least 24 h. About 1 hour prior to the coating step, a further 75 g of a commercial 30% by weight zirconium nitrate sol from MEL Chemicals are added to the slip.

The precoated PAN nonwoven is then coated with this slip in a second continuous roll coating process at a belt speed of about 8 m/h and T=250° C. The end result is a separator having an average pore size of 450 nm, possessing very good adhesivity and excellent stability even in very alkaline media (pH>10). This separator is therefore very useful in Ni/MeH or Ag/Zn batteries. These cells have a long-term stability of at least 100 charge cycles.

EXAMPLE 13

Lithium Ion Battery with Hybrid Ceramic Separator

Figure 1:
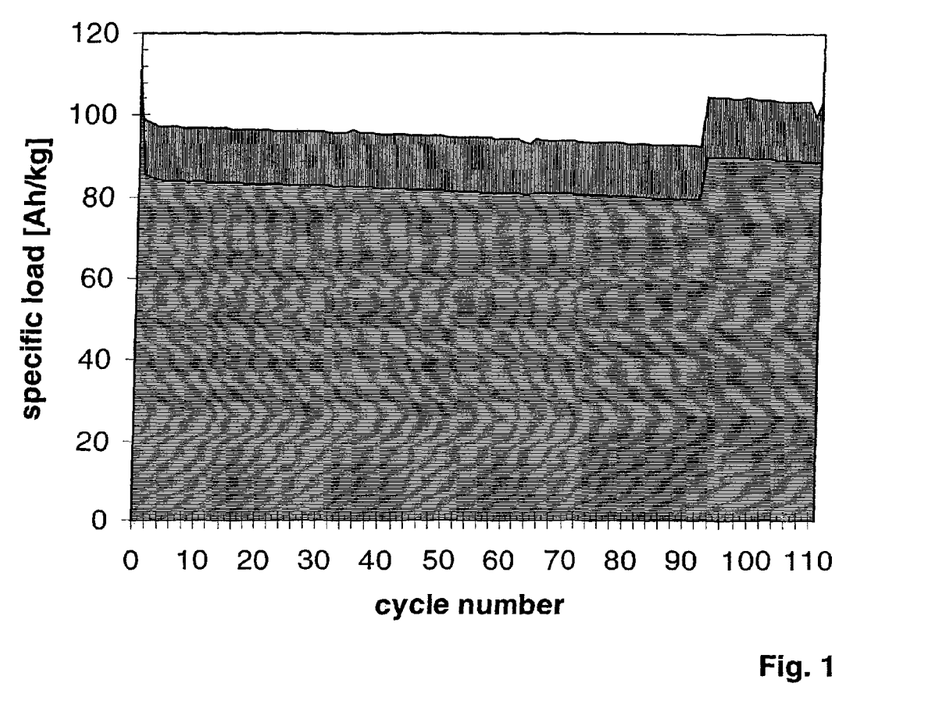

An S450PET separator prepared as per example 1 is installed in a lithium ion cell consisting of a positive mass of $LiCoO_2$, a negative mass consisting of graphite and an electrolyte composed of $LiPF_6$ in ethylene carbonate-dimethyl carbonate [$LiCoO_2$ (36.3 mg), active mass 86%//S-450-PET_2, EC/DMC1:1, 1M LiPF6//graphite (17.0 mg), active mass 90%]. The charging behavior of this battery was tested. The result is illustrated in graphic form in FIG. 1. The battery decreases in load capacity only minimally, by a few percentage points, after about 100 cycles. Even increasing the charging voltage from 4.1 to 4.2 volts in the 93rd charge cycle does not harm the battery.

What is claimed is:

1. A process for producing an electrically insulating separator comprising applying to a flexible substrate in sheet form having a multiplicity of openings a porous electrically insulating ceramic coating on and in said substrate, by applying a suspension comprising at least one oxide of the metals selected from the group consisting of Al, Zr, Si, Ti, Y and mixtures thereof and a sol and heating one or more times to solidify said suspension on and in said substrate,
wherein an adhesion promoter comprising a pure oxide and an organofunctional silane is added to said suspension prior to applying to said substrate, and
the material of said substrate being selected from nonwoven electrically nonconductive fibers of polymers and/or natural fibers having a porosity of more than 50%.

2. The process of claim 1, wherein said sol comprises less than 50% by weight of water and/or acid.

3. The process of claim 1, wherein said suspension is brought onto and into said substrate by printing on, pressing on, pressing in, rolling on, knifecoating on, spreadcoating on, dipping, spraying or pouring on.

4. The process of claim 1, wherein said flexible substrate is a nonwoven of polymeric fibers.

5. The process of claim 1, wherein said fibers are selected from the group consisting of polyacrylonitrile, polyester, polyimide, polyamide, polytetrafluoroethylene, polyolefin and mixtures thereof.

6. The process of claim 1, wherein said suspension comprises at least one sol, at least one semimetal oxide sol or at least one mixed metal oxide sol or a mixture thereof, and is prepared by suspending at least one inorganic component in at least one of these sols.

7. The process of claim 6, wherein said sols are obtained by hydrolyzing at least one metal compound, at least one semimetal compound or at least one mixed metal compound using water or an acid or a combination thereof.

8. The process of claim 7, wherein said metal compound hydrolyzed is at least one metal alkoxide compound or at least one semimetal alkoxide compound selected from the alkoxide compounds of the elements selected from the group consisting of Zr, Al, Si, Ti, Y and mixtures thereof or at least one metal nitrate, metal carbonate or metal halide selected from the metal salts of the elements selected from the group consisting of Zr, Al, Si, Ti, Y and mixtures thereof.

9. The process of claim 6, wherein the mass fraction of said suspended component is from 0.1 to 500 times that of the sol used.

10. The process of claim 1, wherein said pure oxide is an oxide of the elements selected from the group consisting of Zr, Al, Si, Ti and mixtures thereof.

11. The process of claim 1, wherein said organofunctional silane is selected from the group consisting of 3-aminopropyltriethoxysilane, 2-aminoethyl-3-aminopropyltrimethoxysilane, 3-glycidyloxy-trimethoxysilane, 3-methacryloyloxypropyltrimethoxysilane, vinyltriethoxysilane, vinyltrimethoxysilane, vinyltris(2-methoxyethoxy)silane and mixtures thereof.

12. The process of claim 1, wherein said suspension on and in said support is solidified by heating to 50-350° C.

13. The process of claim 12, wherein heating is effected from 110-280° C. for from 0.5 to 10 minutes.

14. A battery comprising a separator prepared by the process as claimed in claim 1.

15. A lithium battery comprising a separator prepared by the process as claimed in claim 1.

16. A nickel metal hydride battery comprising a separator prepared by the process as claimed in claim 1.

17. A nickel-cadmium battery comprising a separator prepared by the process as claimed in claim 1.

18. A silver-zinc battery comprising a separator prepared by the process as claimed in claim 1.

19. A zinc-air battery comprising a separator prepared by the process as claimed in claim 1.

20. The process of claim 1, wherein said separator has a thickness of less than 80 μm.

21. The process of claim 1, wherein said polymeric fiber is present and is from 1 to 25 μm in diameter.

22. The process of claim 1, wherein said flexible substrate has a porosity of from 50% to 97%.

23. The process of claim 1, wherein said nonwoven fiber is from 15 to 80 μm in thickness.

24. The process of claim 1, wherein said separator has a porosity of from 10% to 70%.

25. The process of claim 1, wherein said separator has a breaking strength of more than 1 N/cm.

26. The process of claim 1, wherein said separator is bendable around a radius down to 100 m without damage.

27. The process of claim 1, wherein said separator is bendable around a radius down to 10 mm without damage.

28. The process of claim 1, wherein the coating is prepared from a sol or suspension comprising a solvent which comprises at least one alcohol or at least one hydrocarbon, or mixtures thereof.

* * * * *